United States Patent [19]

Naarmann et al.

[11] Patent Number: 4,665,129

[45] Date of Patent: May 12, 1987

[54] ELECTRICALLY CONDUCTIVE THERMOPLASTIC MIXTURES OF MACROMOLECULAR COMPOUNDS AND FINELY DIVIDED PYRROLE POLYMERS

[75] Inventors: Herbert Naarmann, Wattenheim; Burghard Schmitt, Worms; Helmut Barzynski, Bad Durkheim, all of Fed. Rep. of Germany

[73] Assignee: BASF Aktiengesellschaft, Fed. Rep. of Germany

[21] Appl. No.: 711,202

[22] Filed: Mar. 13, 1985

[30] Foreign Application Priority Data

Mar. 15, 1984 [DE] Fed. Rep. of Germany ....... 3409462

[51] Int. Cl.$^4$ .......................... C08L 00/00; H01B 1/06
[52] U.S. Cl. .................................... 525/186; 252/500; 252/518; 252/519; 252/520; 525/185
[58] Field of Search ............... 252/500, 518, 519, 520; 526/258; 525/165, 178, 176, 186, 154, 182, 185; 527/312; 524/80, 401

[56] References Cited

U.S. PATENT DOCUMENTS 4,401,545  8/1983  Naarmann et al. ................. 252/500
4,468,291  8/1984  Naarmann et al. ................. 204/72
4,567,250  1/1986  Naarmann et al. ................. 252/500

FOREIGN PATENT DOCUMENTS 3227914  2/1984  Fed. Rep. of Germany.

*Primary Examiner*—Josephine L. Barr
*Attorney, Agent, or Firm*—Keil & Weinkauf

[57] ABSTRACT

Thermoplastic mixtures based on macromolecular compounds and pyrrole polymers contain finely divided pyrrole polymers which are embedded in a matrix of the macromolecular compound. Such mixtures are prepared by a process in which solutions of the macromolecular compounds and compounds from the class consisting of the pyrroles are polymerized with an oxygen-containing oxidizing agent, and the resulting mixture is separated off from the solvent. Moldings obtained from such mixtures are used as electrical conductors or as electrodes.

8 Claims, No Drawings

ELECTRICALLY CONDUCTIVE THERMOPLASTIC MIXTURES OR MACROMOLECULAR COMPOUNDS AND FINELY DIVIDED PYRROLE POLYMERS

The present invention relates to thermoplastic mixtures which are based on macromolecular compounds and pyrrole polymers, the latter having a particular mean particle size and being embedded in a matrix of the macromolecular compound.

According to K. C. Khulke and R. S. Mann, J. Polym. Sc., Polymer Chemistry Edition, 20 (1982), 1089–1095, pyrrole can be polymerized in aqueous solution in the presence of potassium persulfate so that the polymer separates out in the form of a finely divided black powder.

For many intended uses, for example for the preparation of electronic components, electrical switches, special electrode materials, etc., it is necessary or desirable to convert the electrically conductive, finely pulverulent pyrrole polymers to the desired form for use by means of a further processing step. For example, pulverulent pyrrole polymers must, before being used, generally be pressed to give appropriate moldings. According to the prior unpublished German Patent Application P No. 32 27 914.0, finely divided pyrrole polymers can be pressed to give moldings at from 150° to 300° C. and under not less than 50 bar.

According to an earlier proposal in the unpublished German Patent Application P No. 33 25 892.9, the electrical conductivity of finely divided pyrrole polymers can be improved if the treatment of the pyrroles with an oxygen-containing oxidizing agent is carried out in the presence of a conductive salt.

We have found that the properties of the finely divided pyrrole polymers available to date do not meet all requirements. In particular, the thermoplastic processability of the products for the production of moldings is unsatisfactory.

It is an object of the present invention to provide novel thermoplastic mixtures based on pyrrole polymers and other macromolecular compounds.

We have found that this object is achieved by mixtures of pyrrole polymers and other macromolecular compounds, wherein the pyrrole polymers have a mean particle size of from 0.1 to 10 um and are embedded in a matrix of the macromolecular compound.

The present invention furthermore relates to a process for the preparation of such mixtures and the use of moldings consisting of such mixtures as electrical conductors or as electrodes.

The novel thermoplastic mixtures are electrically conductive systems, the conductivity being from $10^{-7}$ to $10^{-1}$ S/cm. In this method, the pyrrole polymers, as a result of the preparation process, are in finely divided form and homogeneously distributed in the polymer matrix, ie. deep black, virtually unagglomerated pigments are present.

Examples of macromolecular compounds which can be present in the thermoplastic mixtures are polyolefins, such as high pressure and low pressure polyethylene, polypropylene or polyisobutylene. Styrene polymers, such as polystyrene or copolymers of styrene with an acrylonitrile or maleic anhydride, are also suitable.

Finally, chlorine-containing polymers, vinyl chloride or vinylidene chloride are also suitable, while other useful compounds are polymers of acrylates or methacrylates, such as polymethyl methacrylate or poly(n-butyl acrylate). Water-soluble polymers, such as polyvinyl pyrrolidone or polyvinyl alcohol, can also be used.

Polycondensates, nylons, polyesters, polyacetals, polyethers, such as poly-2,5-phenylene ether, and naturally occurring macromolecular compounds, such as cellulose or reaction products of cellulose, are also useful. The polymers are chosen so that the molecular weights are in a range in which the macromolecular compounds are in the solid state at room temperature. Examples of particularly suitable products are those having mean molecular weights of from 5,000 to 250,000, preferably from 10,000 to 100,000.

To prepare the thermoplastic mixtures which contain the macromolecular compounds and a pyrrole polymer, solutions of the macromolecular compounds and of a compound from the class consisting of the pyrroles, or a mixture of a compound from the class consisting of the pyrroles and another compound which is copolymerizable with pyrrole can be treated with an oxygen-containing oxidizing agent.

Advantageously, from 0.2 to 10 moles of the oxidizing agent are used per mole of pyrrole or per mole of a mixture of pyrrole with another compound which is copolymerizable with pyrroles. If less than 1 mole of the oxidizing agent is used, it is found that some of the starting substance used is not converted to polymers. It is not necessary to use larger amounts of oxidizing agents since the amount is sufficient to convert the entire amount of the starting materials to polymers. An excess over and above the stated amount is therefore generally not required but may in some cases have particular effects. Among the oxygen-containing oxidizing agents, peroxo acids and their salts and peroxodisulfuric acid and its alkali metal and ammonium salts have proven particularly useful. Peroxoborates or peroxochromates, such as sodium perborate or potassium bichromate are also preferably used. Permanganates, such as potassium permanganate, are also suitable if small amounts of acid are added to them. The use of hydrogen peroxide is also preferred, but conductive salts have to be present in this case.

Other oxygen-containing oxidizing agents, the peroxides, percarbonates or the organic peroxides generally, such as di-tert.-butyl peroxide, benzoyl peroxide or lauroyl peroxide, and perketals are also suitable.

The mixtures containing finely divided pyrrole polymers are prepared in solution, water-miscible organic solvents having proven useful. Organic solvents, such as dimethyl sulfoxide, methylene chloride, methanol, ethanol, acetonitrile, sulfolane, ethylene carbonate, propylene carbonate, dioxane or tetrahydrofuran, can be used. When water-miscible organic solvents are used, it has proven useful to incorporate small amounts of water in fine dispersion in the organic solvent. Advantageously, the solutions contain from 0.1 to 50, preferably from 1 to 5, % by weight of the pyrrole or of the mixtures of the pyrroles, with or without other compounds, and from 0.5 to 25, preferably from 2 to 15, % by weight of the macromolecular compound. The amount of oxidizing agent added is determined by the above principle. The reaction can advantageously be carried out from 0° to 100° C., preferably from 15° to 40° C., but satisfactory results are generally obtained when the reaction is effected at room temperature.

The weight ratios are chosen so that the thermoplastic mixtures contain from 10 to 90, preferably from 40 to 60, % by weight of macromolecular compound and from 30 to 80, preferably from 40 to 60, % by weight of the pyrrole polymer.

The compounds from the class consisting of the pyrroles, which are suitable for the novel process, are pyrrole itself as well as the substituted pyrroles, such as N-alkylpyrroles, N-arylpyrroles, the pyrroles which are monoalkyl-substituted or dialkyl-substituted at the carbon atoms, and those which are monohalogen-substituted or dihalogen-substituted, at the carbon atoms. According to the invention, it is possible to use pyrrole alone or as a mixture with other compounds from the class consisting of the pyrroles. Preferably, unsubstituted pyrrole itself is used. Where substituted pyrroles are employed, the 3,4-dialkylpyrroles, in particular those where alkyl is of 1 to 4 carbon atoms, and the 3,4-dihalopyrroles, in particular 3,4-dichloropyrrole, are preferred.

If necessary, it is also possible for small amounts, eg. from 0.1 to 10 moles per mole of pyrrole, of other heterocyclic compounds containing a conjugated electron system, such as furan, thiophene or thiazole, to be used concomitantly.

It is also possible to add conductive salts to the solutions; when the finely divided polymer separates out, these conductive salts are incorporated in the polymer structure, so that the conductivity of the resulting finely divided pyrrole polymers is advantageously affected. These conductive salts are also referred to as complexing agents or doping agents.

Examples of conductive salts which have proven useful are $KHSO_4$, $Na_2SO_4$, $HCOOH$, $LiClO_4$, $HClO_4$, $K_2TiF_6$, $NEt_4ClO_4$, $NBu_4ClO_4$, $KAlF_3$, $NaAlF_6$, $KBF_4$, $K_2ZrF_6$, $K_2NiF_4$, $HO_2(NO_3)_2$, $H_2SO_4$, $FeCl_3$, $NOPF_6$, $KAsF_6$ or $NaPF_6$. The concentration of the conductive salts is such that not less than 1 mole of the conductive salts listed above is used per 3 moles of the pyrrole employed or of the other monomers.

According to another method, it is also possible to obtain the thermoplastic mixtures from macromolecular compounds and styrene polymers by mixing the monomeric starting materials for the macromolecular compounds, eg. styrene, acrylonitrile, acrylic acid or methacrylates, with the compound or compounds from the class consisting of the pyrroles, and carrying out the polymerization in solution or suspension in accordance with the above principle using an oxygen-containing oxidizing agent. In this process, not only does the pyrrole, or the mixture of pyrrole with a compound which is copolymerizable with pyrrole, undergo polymerization, but the monomeric starting material is also polymerized to a macromolecular compound. In a preferred procedure, a mixture of the monomeric starting material with the pyrrole is polymerized in aqueous suspension and in the presence of an emulsifier or suspensing agent, under the action of the oxygen-containing oxidizing agent.

In the procedures described above, ie. by polymerizing the pyrrole in the presence of the polymer solution or of the monomeric starting materials, solutions or suspensions of the polymer mixture are obtained. In general, the mixtures can be separated off from the liquid phase by precipitating them, filtering them off under suction and washing them. However, the polymer mixtures prepared according to the invention can also be worked up by evaoorating them down under reduced pressure or in a thin film evaporator.

In the novel thermoplastic mixtures, the pyrrole polymer is present in finely divided form, the mean particle size of the finely divided polymer being from 0.1 to 10, preferably from 0.2 to 0.5, $\mu$m.

The mean particle size (weight average) of the disperse soft component phase was determined by counting the number of particles belonging to the same size class (constant interval) and taking the average, electron micrographs of thin sections being used for this purpose. Using the volumes of the particles (3rd power of the apparent diameter) within the intervals, the cumulative distribution curve is determined. The equivalent diameter can then be read off along the abscissa at the 50% ordinate value. The stated mean diameters represent a mean value for not less than 1000 particles.

The novel thermoplastic mixtures can be converted to moldings by the conventional method of pressing or by other thermoplastic molding methods. Other substances which modify the mechanical or electrical properties can also be added to the mixtures. For example, the molding materials containing products which have a fairly high conductivity can be used for the production of moldings.

The thermoplastic mixtures can be converted to, in particular, moldings which are used as electrical conductors or as electrodes. However, the materials are also suitable for the production of diaphragms, electrical storage systems, switches, semiconductor components or shielding material, or for solar cells.

In the Examples, parts and percentages are by weight.

EXAMPLE 1

6.8 parts of pyrrole are added to a solution of 10 parts of polyacrylonitrile in 100 parts of dimethyl formamide. 65 parts of a two molar solution of sodium peroxydisulfate are added to this solution, while stirring vigorously, the reaction taking place at room temperature. After a few minutes, the solution assumes a very dark color. After about 20 minutes, the product is flocculated by adding water, and is filtered off. Washing with water and methanol and drying in an oven for 5 hours at 50° C. and under 10 mm Hg gives 6.5 parts of a thermoplastic mixture which contains the polypyrrole in the form of fine particles having a diameter of from 0.3 to 0.5 $\mu$m. The specific conductivity of this mixture is about $10^{-4}$ S/cm.

EXAMPLE 2

The procedure described in Example 1 is followed, except that, additionally, 6.5 parts of benzenesulfonic acid are added to the solution. 21.8 parts of the thermoplastic mixture are obtained, in which the mean particle size of the pyrrole polymer is 0.2 $\mu$m. After it has been worked up and dried, the mixture has a conductivity of $5 \times 10^{-1}$ S/cm.

EXAMPLES 3 to 11

The procedure described in Example 1 is followed, except that the macromolecular compounds, solvents, conductive salts and amounts of pyrrole stated in the Table are added.

TABLE 1

| Example | Polymer solution (parts) Polymer/solvent | Additive (in parts) Conductive salt/pyrrole | Amount of product (parts) | Specific electrical conductivity |
|---|---|---|---|---|
| 3 | polystyrene/tetrahydrofuran 6/94 | 5 LiClO$_4$/5 | 12 | $10^{-4}$ |
| 4 | polystyrene/tetrahydrofuran 6/94 | 5 LiClO$_4$/10 | 13.5 | $10^{-5}$ |
| 5 | polystyrene/tetrahydrofuran 6/94 | 6.5 N$^{\oplus}$Bu$_4$BF$_4^{\ominus}$/5 | 10.5 | $8.10^{-1}$ |
| 6 | polyvinyl chloride/tetrahydrofuran 10/90 | 6.5 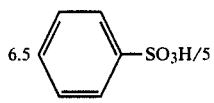—SO$_3$H/5 | 21 | $5.10^{-1}$ |
| 7 | polyvinyl chloride/tetrahydrofuran 10/90 | 5 LiClO$_4$/5 | 15.3 | $10^{-4}$ |
| 8 | polyvinyl alcohol/water 10/90 | 6.5 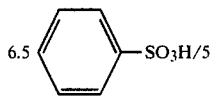—SO$_3$H/5 | 20.6 | $9.10^{-1}$ |
| 9 | polyvinyl pyrrolidone/water 10/90 | 6.5 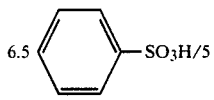—SO$_3$H/5 | 20.3 | $8.10^{-1}$ |
| 10 | n-butyl polyacrylate/toluene 10/90 | 6 NBu$_4$PF$_6$/5 | 20 | $5.10^{-1}$ |
| 11 | polyisobutylene/toluene 5/95 | 5.0 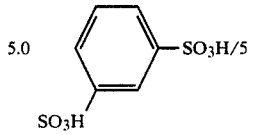—SO$_3$H/5 (with SO$_3$H) | 12 | $10^{-1}$ |

A solution of 15 parts of acrylonitrile and 95 parts of dimethylformamide is heated to 60° C., 1 part of sodium peroxysulfate and 10 parts of water are added, and polymerization is carried out at 80° C. After 1 hour, 5 parts of pyrrole are added, and a further 60 parts of an aqueous two molar solution of sodium peroxysulfate are introduced. Stirring is continued and, after the reaction has continued for three hours at 70° C. 250 parts of water are slowly added, and the product which separates out is filtered off. It is washed with methanol and dried for 3 hours at 100° C. and under 10 mm Hg. The yield is 18 parts of a mixture of polyacrylonitrile and polypyrrole. The mean particle size of the pyrrole polymer is 0.5 μm, and the electrical conductivity of the mixture is $10^{-4}$ S/cm.

EXAMPLE 13

10 parts of styrene, 1 part of sodium laurylsulfate and 5 parts of pyrrole are added to 100 parts of water, and the stirred mixture is heated to 70° C. under nitrogen. 60 parts of a two molar solution of aqueous sodium peroxysulfate solution are metered in over 3 hours, and polymerization is continued for a further hour at 95° C. Thereafter, the mixture is cooled, and the polymer mixture is precipitated with methanol, washed and dried. The yield is 14.2 parts of a polystyrene/polypyrrole mixture which has a specific conductivity of $10^{-2}$ S/cm. The mean particle size is 0.3 μm.

EXAMPLE 14

The procedure described in Example 13 is followed except that 5 parts of sodium benzenesulfonate are also added to the solution. 17 parts of a mixture of polystyrene and polypyrrole are obtained, the specific conductivity of the mixture being $2.10^{-1}$ S/cm.

We claim:
1. A thermoplastic mixture comprising:
   (1) a macromolecular compound having a molecular weight such that the compound is in the solid state at room temperature, and
   (2) a particulate pyrrole polymer having a mean particle size of from 0.1 to 10 μm, said particulate pyrrole polymer being embedded in a matrix of the macromolecular compound, where the macromolecular compound is present in the amount of 10 to 90% by weight and the pyrrole polymer is present in the amount of 30 to 80% by weight.
2. The mixture of claim 1, wherein the pyrrole polymer is a copolymer of a pyrrole compound and a compound copolymerizable with pyrrole.
3. The mixture of claim 2, wherein the copolymerizable compound is furan and the pyrrole compound is pyrrole.
4. The mixture of claim 3, wherein the macromolecular compound is a styrene polymer.
5. The mixture of claim 4, wherein the styrene polymer is polystyrene.
6. The mixture of claim 1, wherein the macromolecular compound is present in the amount of 40 to 60% by weight and the pyrrole polymer is present in the amount of 40 to 60% by weight.
7. A process for the preparation of a thermoplastic mixture comprising:

(1) a macromolecular compound having a molecular weight such that the compound is in the solid state at room temperature, and
(2) a particulate pyrrole polymer having a mean particle size of from 0.1 to 10 um, said particulate pyrrole polymer being embedded in a matrix of the macromolecular compound, where the macromolecular compound is present in the amount of 10 to 90% by weight and the pyrrole polymer is present in the amount of 30 to 80% by weight, wherein a solution of a macromolecular compound is mixed with a compound from the class consisting of the pyrroles, or with a mixture of a compound from this class and another compound which is copolymerizable with pyrrole, and the pyrrole, or the mixture, is polymerized in the pressure of from about 0.2 to 10 moles of an oxygen-containing oxidizing agent per mole of the mixture at a temperature of from 0° to 100° C., and the resulting mixture is separated from the solvent, said solution containing from 0.1 to 50% by weight of pyrrole or mixtures of pyrroles and copolymerizable compounds and from 0.5 to 25% by weight of macromolecular compound.

8. The process of claim 7, wherein the polymerization of the pyrrole, or of the mixture, is carried out in the presence of of not less than 1 mole of a conductive salt per 3 moles of pyrrole or pyrrole mixture.

* * * * *